Patented Oct. 25, 1949

2,485,639

UNITED STATES PATENT OFFICE 2,485,639

GLYCERIDIC OIL COMPOSITIONS AND PROCESSES OF PREPARING THEM

Hans W. Vahlteich, Englewood, N. J., Chester M. Gooding, Staten Island, N. Y., and Ralph H. Neal, deceased, late of North Bergen, N. J., by Ethel Neal, administratrix, North Bergen, N. J., assignors to The Best Foods, Inc., New York, N. Y., a corporation of New Jersey No Drawing. Application December 4, 1948, Serial No. 63,623

16 Claims. (Cl. 99—122)

This application is a continuation-in-part of the applications S. N. 608,101, filed July 31, 1945, S. N. 608,102, filed July 31, 1945, S. N. 608,380, filed August 1, 1945 and S. N. 747,848, filed May 13, 1947.

This invention relates to glyceridic oil compositions.

An object of this invention is to extend the utility of cooking and baking fats by increasing the ease with which they may be employed for different cooking and baking purposes.

Another object of this invention is to provide shortening which, when utilized as a component in baking, results in improved baked products.

Another object of this invention is to extend the range of utility of cooking and baking fats by increasing the ease with which they may be employed in a wide variety of culinary uses.

While glyceridic fats employed for cooking and baking without the addition of any modifying agent are satisfactory for some purposes, they fall far short when utilized as a component in the preparation of certain baked goods. For example, if it is desired to produce a white cake containing more sugar than flour, a glyceridic fat or shortening containing no modifying agent results in an unsatisfactory product. Again, if an unmodified shortening is employed as an ingredient in baking, the batter under certain conditions will be a loose emulsion having a grainy and curdy appearance. Generally, for baked products, the following criteria represent a good shortening for baking purposes:

1. The batter obtained by mixing the shortening with other ingredients of the baked goods should be a tight emulsion which has a smooth and syrupy appearance.
2. The batter should be relatively easy to prepare with a minimum of mixing.
3. The finished baked product should have good eating qualities, i. e., it should be tender, soft, possess a desirable flavor, be readily dispersible in the mouth and have a good grain structure.
4. The finished baked product should be of pleasing appearance, have firmness and fineness of grain, and in particular, have the desired volume.

In accordance with this invention, glyceridic oil compositions are provided which fulfill all of the desired criteria for shortening and other uses and which contain relatively small total quantities of modifying agents. The shortening compositions of this invention are prepared by incorporating in a glyceridic oil a mixture of mono-alkyl, di-alkyl and tri-alkyl citrates in which the alkyl group has at least 14 carbon atoms, and preferably at least 16 carbon atoms, or a mixture of mono-alkylene citrate, di-alkylene citrate and tri-alkylene citrate in which the alkylene group has at least 14 carbon atoms, and preferably at least 18 carbon atoms. For some purposes, the mixture of alkylene citrates in the glyceridic oil composition is unsatisfactory from a taste standpoint. The amounts of mono-ester, di-ester and tri-ester of citric acid in the glyceridic oil or fat composition are $\frac{1}{32}$ to $\frac{3}{8}\%$, and preferably $\frac{1}{16}$ to $\frac{1}{4}\%$, of the mono-ester of citric acid, $\frac{1}{16}$ to $1\frac{1}{2}\%$, and preferably $\frac{1}{8}$ to $\frac{1}{2}\%$, of the di-ester of citric acid, and $\frac{1}{8}$ to $1\frac{1}{4}\%$, and preferably $\frac{1}{8}$ to $\frac{1}{2}\%$, of the tri-ester of citric acid. The mixture of citrates incorporated in the glyceridic oil may be of one alkyl or alkylene specie or a plurality of such species. For example, the mixture may contain mono-stearyl citrate, mono-oleyl citrate, di-stearyl citrate, di-oleyl citrate, tri-stearyl citrate, tri-oleyl citrate and stearyl-oleyl citrates. However, the total amount of mono-esters of citric acid, whether mono-alkyl citrates or mono-alkylene citrates or both, should be within the range of $\frac{1}{32}$ to $\frac{3}{8}\%$, and preferably $\frac{1}{16}$ to $\frac{1}{4}\%$. Likewise, the amounts of di-esters of citric acid and tri-esters of citric acid should be respectively $\frac{1}{16}$ to $1\frac{1}{2}\%$ and preferably $\frac{1}{8}$ to $\frac{1}{2}\%$ of the di-esters, and $\frac{1}{8}$ to $1\frac{1}{4}\%$ and preferably $\frac{1}{8}$ to $\frac{1}{2}\%$ of the tri-esters. It is essential that the mono-, di- and tri-esters of citric acid each be present in the glyceridic oil composition in order to obtain the new results achieved by the practice of this invention.

While the presence of the mono-alkyl citrate or mono-alkylene citrate in which the alkyl group has at least 14 carbon atoms, and preferably at least 16 carbon atoms, materially retards the rancidity of the glyceridic oil composition, retardation of rancidity is sometimes more easily achieved by incorporating in the glyceridic fat composition immediately after deodorization, 0.002 to 0.1% of a mono-alkyl citrate in which the alkyl group has not more than 12 carbon atoms, or a mono-alkylene citrate in which the alkylene group has not more than 12 carbon atoms. The amount of such mono-alkyl or mono-alkylene citrate desirably incorporated in the glyceridic fat composition to obtain a given degree of flavor stability and retardation of rancidity depends upon the molecular weight of the mono-alkyl or mono-alkylene citrate, lesser quantities being required for lower molecular weight citrates. With lower molecular weight mono-alkyl or mono-alkylene citrates such as mono-methyl, mono-ethyl, mono-allyl, or mono-isopropyl citrates, it is advantageous to dissolve initially such citrates in a solubilizing or coupling agent and to add the resulting solution to the glyceridic oil. By the use of such coupling agents or dispersing agents, the lower molecular weight citrates are dispersed throughout the glyceridic oil. This addition to the glyceridic oil of the mono-alkyl citrate in which the alkyl group has not more than 12 carbon atoms or of the mono-alkylene citrate in which the alkylene group has not more than 12 carbon atoms is made immediately after deodorization.

In addition to the mixture of the alkyl or alkylene citrates in which the alkyl or alkylene group has at least 14 carbon atoms, and preferably at least 16 carbon atoms, a hydrophilic lipin containing at least one aliphatic hydrocarbon group having at least 13 carbon atoms, and preferably not more than 21 carbon atoms, is desirably incorporated in the glyceridic oil composition. For example, it has been found advantageous to incorporate in the glyceridic oil composition ½ to 2½%, and preferably 1 to 2%, by weight of aliphatic mono-carboxylic acid mono-esters of glycerol in which the mono-carboxylic acid residue has at least 14, and preferably at least 16, carbon atoms. Desirably, when a mono-carboxylic acid mono-ester of glycerol is incorporated in the oil in addition to the mixture of alkyl or alkylene citrates, the ratio by weight of total citrates to the mono-esters of glycerol in the oil is about 2 to 3. Again, a very satisfactory shortening composition is produced by incorporating in the composition containing the mixed citrates 1 to 6%, and preferably 2 to 4%, of a mono-hydric alkyl or alkylene alcohol having at least 14, and preferably at least 16 carbon atoms. Other hydrophilic lipins usable for this purpose are aliphatic mono-carboxylic acid di-esters of glycerol in which the mono-carboxylic acid residue has at least 14, and preferably at least 16 carbon atoms and the partial esters of propylene glycol, di-propylene glycol, di-glycerol, poly-glycerols, hydroxy-methyl glycerols, sorbitol, hydroxy ethyl sorbitols, sorbitans, mannitols, mannitans, glucose, methyl glucoside and erythritol.

If it is desired to employ both an aliphatic mono-carboxylic acid mono-ester of glycerol in which the mono-carboxylic acid residue has at least 14 carbon atoms and the monohydric alcohol having at least 14 carbon atoms in addition to the mixture of citrates, a satisfactory glyceridic oil composition is produced by incorporating in it, in addition to the mixture of citrates, ¼ to 1¼% of the aliphatic mono-carboxylic acid mono-esters and ½ to 3% of the mono-hydric alcohol.

It is sometimes advantageous to incorporate in the glyceridic oil composition with the mixture of citrates and with or without the hydrophilic lipin containing at least one hydro-carbon group having from 13 to 21 carbon atoms, ⅛ to 1% of commercial vegetable phosphatides, such as soya bean lecithin or corn lecithin. These commercial vegetable phosphatides contain about 55 to 65% of total phosphatides. The amount of phosphorus as phosphatides in these commercial vegetable phophatides is 2.2 to 2.5%.

Since the mono-alkyl, di-alkyl and tri-alkyl citrates or the mono-alkylene, di-alkylene and tri-alkylene citrates are desirably all incorporated in the glyceridic oil, it is advantageous to prepare a mixture of all three esters simultaneously. The mixture of mono-, di- and tri-esters of citric acid may be prepared by the esterification of citric acid and an alcohol, such as an alkyl or alkylene primary or secondary alcohol, preferably by reacting the citric acid and the alcohol in proportions which favor the formation of the mono-, di- and tri-esters of citric acid in the ratio desired in the mixture. The esterification may be conducted by any of the well-known methods employed for the production of esters and the mono-, di- and tri-esters in the resulting reaction mixture may, if desired, be separated from each other by any suitable method, such as fractional crystallization or selective extraction with a suitable solvent. However, for most purposes, the reaction product may be used as such if it contains the mono-, di- and tri-esters of citric acid in the proportions desired in the mixture.

Examples of the mono-, di- and tri-alkyl or alkylene citrates comprising the mixture which is incorporated in the glyceridic oil are the citric acid esters of the following alcohols: tetradecanols, tetradecenols, hexadecanols, hexadecenols, octadecanols, octadecenols, dicosanols, dicosenols, docosanols and docosenols.

Examples of the mono-alkyl citrate in which the alkyl group has not more than 12 carbon atoms and mono-alkylene citrate in which the alkylene group has not more than 12 carbon atoms are the citric acid esters of methanol, ethanol, propanols, propenols, hexanols, hexenols, octanols and octenols.

Examples of aliphatic mono-carboxylic acid mono-esters of glycerol which may be incorporated in the glyceridic oil are the mono-esters of glycerol of the following fatty acids: oleic, myristic, palmitic and stearic acids.

Examples of the mono-hydric alkyl or alkylene alcohols which are used as the hydrophilic lipin are stearyl alcohol, oleyl alcohol, cetyl alcohol and myristyl alcohol.

Most of the hydrophilic lipins employed in the practice of this invention may also be employed as the solubilizing or dispersing aid for the mono-alkyl citrate in which the mono-alkyl group has not more than 12 carbon atoms or mono-alkylene citrate in which the alkylene group has not more than 12 carbon atoms. For example, the aliphatic mono-carboxylic acid mono-esters of glycerol in which the mono-carboxylic acid residue has at least 14, and preferably at least 16, carbon atoms or the mono-hydric alcohols having at least 14, and preferably at least 16, carbon atoms are well suited for the purpose. Accordingly, if the solubilizing agent or dispersing aid for the lower mono-esters of citric acid is one of the hydrophilic lipins employed in the practice of this invention, the quantity of such hydrophilic lipin used as the solubilizing agent should, of course, be included in the calculation of the total hydrophilic lipin in the glyceridic oil composition.

Examples of solubilizing agents, other than the hydrophilic lipins, which may be employed are mono-carboxylic acids having at least 10 carbon atoms, such as stearic acid, palmitic acid, oleic acid, lauric acid and myristic acid.

A more comprehensive understanding of this invention is obtained by reference to the following examples:

*Example 1.—Shortening containing mono-stearyl citrate, di-stearyl citrate, tri-stearyl citrate and mono-glycerides of fatty acids*

A shortening particularly adapted for use in baked products containing a ratio of sugar greater than 1 to 1, such as 1.4 to 1, is produced by incorporating in the shortening about 0.15% of mono-stearyl citrate, 0.5% of di-stearyl citrate, 0.35% of tri-stearyl citrate and 1½% of the mono-glycerides obtained from the fat of the shortening. A mixture of 50% cottonseed oil, 30% cottonseed stearin and 20% peanut oil is hydrogenated and deodorized to produce a shortening composition.

To 5 kilograms of the mixed hydrogenated oils are added 150 grams of a mixture of the mono- and di-glycerides prepared from the mixture of oils. The mono- and di-glycerides are prepared from the mixture of oil by reacting glycerin with the oil in the presence of sodium bicarbonate. The amounts of oil and glycerin added are such as to produce a mixture of about 50% mono-glycerides and about 50% di-glycerides. This mixture of mono- and di-glycerides is added at a temperature of about 35 to 50° C. to the main body of the mixture of hydrogenated oils. 50 grams of a mixture of mono-stearyl citrate, di-stearyl citrate and tri-stearyl citrate are also added to the main body of hydrogenated oil, preferably by initially dissolving them in a small quantity of the oil which is heated to a temperature of about 60° C. and adding the resulting solution to the main body of the oil. The mono-stearyl, di-stearyl and tri-stearyl citrates contain about 15% mono-stearyl citrate, 50% di-stearyl citrate and 35% tri-stearyl citrate.

The mixture of mono-stearyl citrate, di-stearyl citrate and tri-stearyl citrate is prepared as follows:

12.1 kilograms of citric acid mono-hydrate are added to 30 kilograms of commercial stearyl alcohol which is previously melted. During the addition, the mixture is agitated. The mixture is held at 150° C. under reduced pressure for a period of 1½ hours. At the end of this period, boiling and foaming ceases substantially. The resulting product which consists of a mixture of mono-stearyl citrate, di-stearyl citrate and tri-stearyl citrate has an acid value of about 83, a saponification value of about 249.0 and a melting point of about 51–68° C. and a color on the Lovibond scale of about 36Y–5.8R.

*Example 2.—Shortening composition containing mono-stearyl citrate, di-stearyl citrate and tri-stearyl citrate*

A shortening composition adapted for use in the preparation of baked products having relatively low sugar content produced by incorporating in a shortening consisting of about 25% soya bean oil and the balance cottonseed oil which are both hydrogenated and deodorized, 0.15% of mono-stearyl citrate, 0.5% of di-stearyl citrate and 0.35% of tri-stearyl citrate. Alternately, a good shortening is produced by doubling the quantity of the stearyl citrates so that the resulting shortening contains 0.3% mono-stearyl citrate, 1.0% of di-stearyl citrate and 0.7% of tri-stearyl citrate. The mono-stearyl citrate, di-stearyl citrate and tri-stearyl citrate may be prepared as described in Example 1, and the mixture of stearyl citrates is preferably added to the oil by initially dissolving the mixture in a small quantity of the oil at a temperature of about 60° C. and adding the resulting solution to the main body of the oil.

*Example 3.—Shortening containing mono-stearyl citrate, di-stearyl citrate, tri-stearyl citrate and stearyl alcohol*

To 5 kilograms of a hydrogenated and deodorized oil containing 60% peanut oil and 40% cottonseed oil are added 200 grams of stearyl alcohol and 50 grams of a mixture of stearyl citrates containing 15% of mono-stearyl citrate, 50% di-stearyl citrate and 35% of tri-stearyl citrate. Desirably, the mixture of stearyl citrates, which is prepared in accordance with the method described in Example 1, is dissolved in a small quantity of the oil at a temperature of 60° C. and the resulting solution is added to the main body of the oil.

Desirably, 1.25 grams of mono-isopropyl citrate are incorporated in the hydrogenated oil immediately after deodorization. If the mono-isopropyl citrate is incorporated in the oil, it can conveniently be added by dissolving it in the stearyl alcohol prior to the addition of that substance to the main body of the oil.

The mono-isopropyl citrate is prepared as follows:

260 grams of anhydrous citric acid are mixed with 130 grams of commercial isopropyl alcohol, and the mixture is heated at 155° C. for 2 hours in a closed vessel. The pressure developed by the alcohol corresponds to about 55 lbs. per square inch. The alcohol is then evaporated under reduced pressure with a nitrogen stream at 130° C. A typical acid value of the resulting product is 386 and a typical saponification number 702. A typical ratio of free carboxyl to total carboxyl is 0.55.

Pure mono-isopropyl citrate may be obtained from this preparation by causing it to precipitate from ethyl ether solutions by the addition of petroleum ether.

*Example 4.—Shortening containing mono-myristyl citrate, di-myristyl citrate, tri-myristyl citrate and mono-glycerides of fatty acid*

To 5 kilograms of a mixture of hydrogenated and deodorized oils consisting of about 35% soya bean oil and about 65% cottonseed oil are added 150 grams of a mixture of the mono- and di-glycerides prepared from the mixture of the hydrogenated oils and 100 grams of a mixture of a mono-myristyl citrate, di-myristyl citrate and tri-myristyl citrate containing about 20% mono-myristyl citrate, 50% di-myristyl citrate and 30% tri-myristyl citrate. The mixture of mono- and di-glycerides which contains about 50% of the mono-glycerides and about 50% of the di-glycerides was prepared from the mixture of hydrogenated soya bean and cottonseed oils in the same manner as the mono- and di-glycerides were produced as described in Example 1. The mixture of mono-myristyl citrate, di-myristyl citrate and tri-myristyl citrate was initially dissolved in a small quantity of the mixture of hydrogenated soya bean and cottonseed oil and heated to 60° C. prior to addition to the main body of the oil.

The mixture of mono-myristyl citrate, di-myristyl citrate and trim-myristyl citrate was prepared as follows:

31 kilograms of anhydrous citric acid are added to 69 kilograms of commercial myristyl alcohol which is previously melted. During the addition, the mixture is agitated. The mixture is heated at 150° C. under reduced pressure for a period of 1½ hours and at the end of this period boiling and foaming ceases substantially. The resulting product which consists of mono-myristyl citrate, di-myristyl citrate and tri-myristyl citrate has an acid value of about 99 and a saponification value of about 291.

*Example 5.—Shortening containing mono-oleyl citrate, di-oleyl citrate, tri-oleyl citrate and mono-glycerides of fatty acid*

To 5 kilograms of a hydrogenated and deodorized lard are added 150 grams of a mixture of the mono- and di-glycerides prepared from the lard and 25 grams of a mixture of mono-oleyl citrate, di-oleyl citrate and tri-oleyl citrate. The mixture of mono- and di-glycerides of the lard is prepared in the same manner as described for the mono- and di-glycerides in Example 1, except that hydrogenated lard is employed instead of the mixture of oils described in that example. The mixture of mono-oleyl citrate, di-oleyl citrate and tri-oleyl citrate which contains about 20% mono-oleyl citrate, 60% di-oleyl citrate and 20% tri-oleyl citrate is added directly to the oil.

The mixture of mono-oleyl citrate, di-oleyl citrate and tri-oleyl citrate is prepared as follows:

12.1 kilograms of citric acid mono-hydrate are added to 30 kilograms of commercial oleyl alcohol. During the addition, the mixture is agitated. The mixture is held at 150° C. under reduced pressure for a period of 1½ hours. At the end of this period, boiling and foaming cease substantially. The resulting product which consists of the mixture of mono-, di- and tri-oleyl citrates has an acid value of about 68 and a saponification value of about 242.

*Example 6.—Shortening composition containing mono-palmityl citrate, di-palmityl citrate, tri-palmityl citrate and the mono-glycerides of fatty acid*

To 5 kilograms of lard are added 150 grams of a mixture of mono- and di-glycerides derived from lard and 50 grams of a mixture of mono-palmityl citrate, di-palmityl citrate and tri-palmityl citrate. The mixture of mono- and di-glycerides which contains about 50% of mono-glycerides and 50% di-glycerides is produced from the lard in accordance with the method described in Example 1. The mixture of mono-, di- and tri-palmityl citrates which contains about 15% mono-palmityl citrate, about 50% di-palmityl citrate and about 35% tri-palmityl citrate is initially dissolved in a small quantity of the lard, heated to about 60° C. and the resulting solution is added to the main body of lard.

The mixture of mono-, di- and tri-palmityl citrates is prepared as follows:

285 grams of anhydrous citric acid are added to 71.5 grams of commercial palmityl alcohol which is previously melted. During the addition, the mixture is agitated. The mixture is held at 150° C. under reduced pressure for a period of 1½ hours. At the end of this period, boiling and foaming ceases substantially. The resulting product which consists of a mixture of mono-, di- and tri-palmityl citrates has an acid value of about 92 and a saponification value of about 272.

Lecithin may be added to the shortening compositions prepared in accordance with Examples 1 to 6 in amounts of ⅛ to 1%.

The term glyceridic oil composition throughout the description and claims denotes any liquid or solid fat which may or may not be specially processed to attain desirable properties, such as plasticity.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. An edible glyceridic oil composition having incorporated therein a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being $\frac{1}{32}$ to ⅜% of mono-aliphatic citrate, $\frac{1}{16}$ to 1½% of di-aliphatic citrate and ⅛ to 1¼% of tri-aliphatic citrate.

2. An edible glyceridic oil composition having incorporated therein a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being $\frac{1}{32}$ to ⅜% of said mono-aliphatic citrate, $\frac{1}{16}$ to 1½% of said di-aliphatic citrate and ⅛ to 1¼% of said tri-aliphatic citrate, and 0.002 to 0.1% of a mono-aliphatic ester of citric acid selected from the class consisting of mono-alkyl citrates in which the alkyl group has not more than 12 carbon atoms and mono-alkylene citrates in which the alkylene group has not more than 12 carbon atoms.

3. An edible glyceridic oil composition having incorporated therein a mixture of mono-alkyl, di-alkyl and tri-alkyl citrates, in which the alkyl group has at least 16 carbon atoms, the amounts of said mono-alkyl, di-alkyl and tri-alkyl citrates in said composition being $\frac{1}{16}$ to ¼% of mono-alkyl citrate, ⅛ to ½% of di-alkyl citrate and ⅛ to ½% of tri-alkyl citrate.

4. An edible glyceridic oil composition having incorporated therein a mixture of mono-alkylene, di-alkylene and tri-alkylene citrates, in which the alkylene group has at least 16 carbon atoms, the amounts of said mono-alkylene, di-alkylene and tri-alkylene citrates in said composition having $\frac{1}{16}$ to ¼% of mono-alkylene citrate, ⅛ to ½% of di-alkylene citrate and ⅛ to ½% of tri-alkylene citrate.

5. An edible glyceridic oil composition having incorporated therein a significant amount of a hydrophilic lipin containing at least one aliphatic hydrocarbon group having from 13 to 21 carbon atoms and a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of tri-aliphatic citrate.

6. An edible glyceridic oil composition having incorporated therein ½ to 2½% of aliphatic mono-carboxylic acid mono-esters of glycerol in which the carboxylic acid residue has at least 14 carbon atoms and a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of trialiphatic citrate.

7. An edible glyceridic oil composition having incorporated therein ½ to 2½% of aliphatic mono-carboxylic acid mono-esters of glycerol in which the carboxylic acid residue has at least 14 carbon atoms and a mixture of mono-aliphatic, di-aliphatic and tri-aliphatic citrates, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of tri-aliphatic citrate, the ratio of said mixture of aliphatic citrates to said aliphatic mono-carboxylic acid mono-esters of glycerol being about 2 to 3.

8. An edible glyceridic oil composition having incorporated therein ½ to 2½% of aliphatic mono-carboxylic acid mono-esters of glycerol in which the mono-carboxylic acid residue has at least 14 carbon atoms and a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/16 to 1¼% of tri-aliphatic citrate, and 0.002 to 0.1% of a mono-aliphatic ester of citric acid selected from the class consisting of mono-alkyl citrates in which the alkyl group has not more than 12 carbon atoms and mono-alkylene citrates in which the alkylene group has not more than 12 carbon atoms.

9. An edible glyceridic oil composition having incorporated therein 1 to 2% of mono-carboxylic acid mono-esters of glycerol in which the carboxylic acid residue has at least 16 carbon atoms and a mixture of mono-aliphatic, di-aliphatic and tri-aliphatic citrates, in which the aliphatic groups in said citrates have at least 16 carbon atoms and are selected from the class consisting of alkyl groups and alkylene groups, the amounts of said mono-aliphatic, di-aliphatic and tri-aliphatic citrates in said composition being 1/16 to ¼% of mono-aliphatic citrate, 1/8 to ½% of di-aliphatic citrate and 1/8 to ½% of tri-aliphatic citrate.

10. An edible glyceridic oil composition having incorporated therein 1 to 6% of a mono-hydric alcohol selected from the class consisting of alkyl and alkylene alcohols having at least 14 carbon atoms and a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of tri-aliphatic citrate.

11. An edible glyceridic oil composition having incorporated therein 1 to 6% of a mono-hydric alcohol selected from the class consisting of alkyl and alkylene alcohols having at least 14 carbon atoms, a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of tri-aliphatic citrate, and 0.002 to 0.1% of a mono-aliphatic ester of citric acid selected from the class consisting of mono-alkyl citrates in which the alkyl group has not more than 12 carbon atoms and mono-alkylene citrates in which the alkylene group has not more than 12 carbon atoms.

12. An edible glyceridic oil composition having incorporated therein 2 to 4% of a mono-hydric alcohol selected from the class consisting of alkyl and alkylene alcohols having at least 16 carbon atoms and a mixture of mono-aliphatic, di-aliphatic and tri-aliphatic citrates, in which the aliphatic groups in said citrates have at least 16 carbon atoms and are selected from the class consisting of alkyl groups and alkylene groups, the amounts of said mono-aliphatic, di-aliphatic and tri-aliphatic citrates in said composition being 1/16 to ¼% of mono-aliphatic citrate, 1/8 to ½ of di-aliphatic citrate and 1/8 to ½% of tri-aliphatic citrate.

13. An edible glyceridic oil composition having incorporated therein ¼ to 1¼% of aliphatic mono-carboxylic acid mono-esters of glycerol in which the carboxylic acid residue has at least 14 carbon atoms, ½ to 3% of a mono-hydric alcohol selected from the class consisting of alkyl and alkylene alcohols having at least 14 carbon atoms and a mixture of mono-aliphatic, di-aliphatic and tri-aliphatic citrates, in which the aliphatic groups in said citrates have at least 14 carbon atoms and are selected from the class consisting of alkyl groups and alkylene groups, the amounts of said mono-aliphatic, di-aliphatic and tri-aliphatic citrates in said composition being 1/32 to 3/8% of mono-aliphatic citrate, 1/16 to 1½% of di-aliphatic citrate and 1/8 to 1¼% of tri-aliphatic citrate.

14. The method of producing an edible glyceridic oil composition which comprises incorporating in an edible glyceridic oil a mixture of a mono-aliphatic citrate, a di-aliphatic citrate and a tri-aliphatic citrate in which the aliphatic groups in said citrate have at least 14 carbon atoms and are selected from the class consisting of alkyl groups and alkylene groups, the amount of said mono-aliphatic, di-aliphatic and tri-aliphatic citrates incorporated in said oil being 1/32 to 3/8% of mono-aliphatic citrate, 1/16 to 1½% of di-aliphatic citrate, and 1/8 to 1¼% of tri-aliphatic citrate.

15. The method of producing an edible glyceridic oil composition which comprises incorporating in an edible glyceridic oil a significant amount of a hydrophilic lipin containing at least one aliphatic hydrocarbon group having at least 13 carbon atoms and a mixture of a mono-aliphatic citrate, a di-aliphatic citrate and a trialiphatic citrate, in which the aliphatic groups in said citrates have at least 14 carbon atoms and are selected from the class consisting of alkyl and alkylene groups, the amount of said mono-aliphatic, di-aliphatic and tri-aliphatic citrates incorporated in said oil being $\frac{1}{32}$ to $\frac{3}{8}$% of mono-aliphatic citrate, $\frac{1}{16}$ to 1½% of di-aliphatic citrate, and ⅛ to 1¼% of tri-aliphatic citrate.

16. The method of producing an edible glyceridic oil composition which comprises incorporating in an edible glyceridic oil a significant amount of alphatic mono-carboxylic acid mono esters of glycerol in which the carboxylic acid residue has at least 14 carbon atoms, and a mixture of a mono-aliphatic citrate, a di-aliphatic citrate and a tri-aliphatic citrate, in which the aliphatic groups in said citrates have at least 14 carbon atoms and are selected from the class consisting of alkyl and alkylene groups, the amount of said mono-aliphatic, di-aliphatic and tri-aliphatic citrates incorporated in said oil being $\frac{1}{32}$ to $\frac{3}{8}$% of mono-aliphatic citrate, $\frac{1}{16}$ to 1½% of di-aliphatic citrate, and ⅛ to 1¼% of tri-aliphatic citrate.

HANS W. VAHLTEICH.
CHESTER M. GOODING.
ETHEL NEAL,
Administratrix of the Estate of Ralph H. Neal, Deceased.

REFERENCES CITED

The following references are of record in the file of this patent:

UNITED STATES PATENTS

| Number | Name | Date |
|---|---|---|
| 1,985,496 | Harris | Dec. 25, 1934 |

OTHER REFERENCES

Bulletin No. 10, The Compositions and Food Value of Margarine, National Association of Margarine Mfg., Washington 4, D. C., April 1944, page 2.

Certificate of Correction

Patent No. 2,485,639                                                                October 25, 1949

HANS W. VAHLTEICH ET AL.

It is hereby certified that errors appear in the printed specification of the above numbered patent requiring correction as follows:

Column 4, line 5, for "phophatides" read *phosphatides*; column 7, line 1, for "trim-myristyl" read *tri-myristyl*; column 10, line 36, for "¼ to ½" read ¼ *to* ½%;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*